United States Patent [19]
Hewitt

[11] Patent Number: 5,831,155
[45] Date of Patent: Nov. 3, 1998

[54] APPARATUS AND METHOD FOR SIMULATING ROCKET-TO-RAMJET TRANSITION IN A PROPULSION SYSTEM

[75] Inventor: Patrick W. Hewitt, Warrenton, Va.

[73] Assignee: Atlantic Research Corporation, Vienna, Va.

[21] Appl. No.: 758,867

[22] Filed: Dec. 2, 1996

[51] Int. Cl.⁶ .................................................. G01M 15/00
[52] U.S. Cl. ........................................ 73/117.4; 73/117.1
[58] Field of Search ........................ 73/112, 116, 117.1, 73/117.4, 865.6

[56] References Cited

U.S. PATENT DOCUMENTS

| | | |
|---|---|---|
| 3,078,660 | 2/1963 | Hansel . |
| 3,514,952 | 6/1970 | Schumacher et al. . |
| 3,792,584 | 2/1974 | Klees . |
| 3,812,672 | 5/1974 | Escher . |
| 3,834,161 | 9/1974 | Quigley, Jr. et al. . |
| 3,844,118 | 10/1974 | Wilkinson . |
| 4,328,703 | 5/1982 | McClure et al. ....................... 73/117.4 |
| 4,537,066 | 8/1985 | Simpson ................................ 73/117.4 |
| 4,631,916 | 12/1986 | Le Tanter et al. . |
| 4,909,031 | 3/1990 | Grieb . |
| 4,919,364 | 4/1990 | John et al. . |
| 5,284,014 | 2/1994 | Brossier et al. . |
| 5,311,735 | 5/1994 | Orlando . |
| 5,347,807 | 9/1994 | Brossier et al. . |
| 5,396,793 | 3/1995 | Colletti ................................. 73/117.4 |
| 5,419,116 | 5/1995 | Rast et al. . |
| 5,435,127 | 7/1995 | Luffy et al. . |
| 5,589,632 | 12/1996 | Chevalier et al. ..................... 73/117.4 |

*Primary Examiner*—George M. Dombroske
*Assistant Examiner*—Eric S. McCall
*Attorney, Agent, or Firm*—Sixbey Friedman Leedom & Ferguson; Frank P. Presta

[57] ABSTRACT

A test facility for realistically simulating selected operating conditions for a multi-mode aircraft propulsion system employs bypass ducting to rapidly introduce heated compressed air to a ramjet engine immediately following rocket booster operation. Heated compressed airflow from a suitable supply is initially utilized to ensure that incidental ducting, control elements, and instrumentation are stabilized in temperature, by bypassing the totality of the heated compressed airflow from a location close to the multi-mode propulsion system out to ambient atmosphere. Upon stable conditions being realized, the rocket thrust component of the propulsion system is actuated and selected physical parameters e.g., pressure, in the multi-mode propulsion system are measured. Upon certain criteria being fulfilled, inlet port covers are opened, allowing heated, compressed air to pass through to the ramjet engine, as well as continuing to bypass a reduced amount of air. A mixture of fuel and a portion of the available heated compressed air is then burned in a ramburner component of the propulsion system. The thrust generated by the propulsion system in its rocket propulsion mode, rocket-to-ramjet transition, and ramjet propulsion mode is measured and analyzed in conjunction with other measured parameters.

13 Claims, 6 Drawing Sheets

APPARATUS AND METHOD FOR SIMULATING ROCKET-TO-RAMJET TRANSITION IN A PROPULSION SYSTEM

FIELD OF THE INVENTION

This application relates to apparatus and a method for realistically simulating, e.g., for study, research and development, the airflow through a multi-mode aircraft or missile propulsion system in which a transition occurs from rocket propulsion to ramjet propulsion.

BACKGROUND OF THE RELATED ART

Aircraft (a term which in the present context includes missiles) often have propulsion systems which do not continually operate in a single mode. It is well known that such aircraft often have to accelerate very rapidly during and immediately after launch, regardless of fuel efficiency. Once such an aircraft has accelerated to a sufficiently high speed, it may become more efficient to switch over to a ramjet mode of propulsion in which oxygen from ambient approaching air can be economically utilized with onboard fuel for sustained supersonic or hypersonic flight to a target destination. Such a rocket-to-ramjet propulsion transition capability is a particularly important one for staged aircraft and sophisticated missiles.

In the course of developing such propulsion systems, an inherently expensive activity, it is necessary to be able to closely simulate the anticipated performance of an engine during the transition from rocket propulsion to ramjet propulsion on a test bed where sophisticated instrumentation may be employed for high-speed measurement of time-varying parameters such as flow pressure, velocity and temperature distributions, thrust, and the like. When an aircraft has been accelerated by initial rocket propulsion to a sufficiently high speed as to enable transition to ramjet propulsion, motion between the engine intake and the ambient air occurs at such a high relative velocity that a sufficient, continuous, stable intake airflow is available so that when the rocket motor stops providing rocket thrust the ramjet portion of the propulsion system utilizes combustion of fuel in incoming air to generate and then sustain a corresponding ramjet thrust to further propel the aircraft. It is not quite so simple at a stationary, ground-based, test bed where the engine being tested is always at zero air-speed relative to the ambient atmosphere.

In one type of test facility, with the use of known equipment such as compressors and the like, a quantity of previously compressed air is stored, heated as necessary, and utilized during a test to obtain the ramjet mode of operation as soon as practically possible following termination of the rocket mode. In such a system, the airflow to a ramburner from a source of stored compressed air is fed directly into the missile inlet (referred to as direct-connect testing), and may be initiated by rapid actuation of a valve.

Another alternative is to have a large capacity airflow generating system to provide a "free jet" of a cross-section significantly larger than that of the missile to be propelled by the type of propulsion system to be tested. Although a more representative test operation including missile inlet aerodynamic performance can be obtained in this manner, the apparatus and operating costs for such a system are both prohibitively expensive for development efforts.

A major problem in operating such a direct-connect test system is that because of the thermal mass of the incidental ducting, control valves, etc., between the air supply source and the combustion zone of the test engine, the incoming supply of air experiences significant time-dependent variations in its physical parameters, e.g., total pressure, temperature and velocity, and is not immediately available in an optimum state to smoothly initiate the ramjet combustion process. The incoming airflow, in fact, may adversely affect the rocket motor combustion during the terminal stages of its operation, and it may take too long before the desired ramjet propulsion portion of the multi-mode system is in sustained operation. In this context, even a few seconds delay may represent a significant and unacceptable departure from test conditions which are intended to simulate certain real-life operations of the aircraft engine.

Accordingly, there is a significant and pressing need for apparatus and a method that will enable engineers and researchers to realistically simulate the in-engine combustion environment and air and fuel flows which characterize rocket-to-ramjet propulsion mode transitions.

There are some systems known for effecting engine operation transition from rocket to ramjet operation, but these are carried on a missile capable of rapid motion relative to ambient atmosphere. Examples of these include: U.S. Pat. No. 3,844,118, titled "Aft Inlet Ramjet Powered Missile", to Wilkinson; and U.S. Pat. No. 4,631,916, titled "Integral Booster/Ramjet Drive", to Le Tanter et al. There are also other known systems for adjusting airflow to enable a jet engine to switch operations from a ramjet mode to a turbojet mode and vice versa, for example: U.S. Pat. No. 5,347,807, titled "Combined Jet Engine with Ramjet and Turbojet", and U.S. Pat. No. 5,284,014, titled "Turbojet-Ramjet Hypersonic Aircraft Engine", both to Brossier et al; and U.S. Pat. No. 4,919,364, titled "Propulsion System for Hypersonic Flight", to John et al. As previously noted, all of these known systems have one thing in common: they are intended for switchover from one mode of operation to another while the aircraft or missile is in flight, i.e., the engine intake faces an incoming high-speed airflow due to aircraft motion.

The present invention is intended to provide a functioning test-bed apparatus, and a method for its use, to enable fully instrumented, ground-level, detailed study of the operation of a multi-mode propulsion system that changes over from rocket propulsion to ramjet propulsion.

SUMMARY OF THE INVENTION

A principal object of the present invention is to provide apparatus to enable a multi-mode propulsion system for aircraft or missiles to operate in a rocket propulsion mode and to then make an operational transition to a ramjet propulsion mode.

Another object of this invention is to provide a test-bed apparatus in which a multi-mode propulsion system suitable for aircraft or missiles may be studied while operating in a rocket propulsion mode, during a transition to ramjet propulsion mode, and then during ramjet propulsion mode.

In a related aspect of this invention, there is provided a method for setting up on a stationary test-bed a multi-mode propulsion system for aircraft or missiles, wherein the system operates first in a rocket propulsion mode, then changes operation to a ramjet propulsion mode, and continues operation in the ramjet propulsion mode.

These and other related objects of this invention are realized by providing an apparatus comprising an elongate thrust chamber having a longitudinal thrust axis, an exit opening, a ramjet fuel inlet, and a ramjet airflow inlet port. A rocket motor is mounted inside the thrust chamber between the exit opening and the ramjet airflow inlet port to provide a rocket thrust along the thrust axis via the exit opening. An airflow supply means provides a controlled flow of air, and a fuel supply means provides a controlled flow of a ramjet fuel to the thrust chamber. A main air duct means is provided for communicating the airflow supply means to the ramjet airflow inlet port through a branch duct via a subsonic inlet section and a rapidly openable port cover means provided for selectively opening the airflow inlet port. The subsonic inlet section is located upstream of the airflow inlet port. A bypass duct means is provided to have an inlet end communicating with the branch duct at a location upstream of the subsonic inlet section, for conveying a first portion of the airflow away from the main air duct means and through a calibrated exit in a direction perpendicular to the thrust axis. A control means controls a flow rate and selected state parameters of said airflow, an opening of the port cover means to deliver a second portion of the airflow from the main air duct means via the airflow inlet port into the thrust chamber, and the flow of ramjet fuel to enable controlled combustion thereof in the second portion of the airflow inside the elongate thrust chamber in a ramjet mode to produce a corresponding ramjet thrust along the axis via the exit opening.

According to another aspect of this invention there is also provided a method of operating a test facility having respective sources providing an airflow at selected pressure and temperature through a main duct via a plurality of branch ducts provided with respective bypasses, for selectively providing a first portion of the airflow into a multi-mode thrust engine structure. The engine structure includes a rocket thruster component and a ramjet thruster component, both aligned to deliver respective rocket and ramjet thrusts along a common axis. The method includes the steps of controlling the airflow to pass the same entirely through the main duct, the branch ducts, and the bypasses, until stable values of a total flow rate, a total pressure and temperature are obtained for the airflow. Operation of the rocket thruster component is then initiated, and a first thrust generated thereby along the axis for a selected rocket thrust period is measured. A pressure, thrust, or acceleration drop corresponding to a termination of said first thrust is sensed and, in correspondence with the sensed parameter, the first portion of the stabilized airflow is caused to pass through the engine structure and a second portion of the stabilized airflow is caused to pass through the bypasses. A controlled fuel flow is initiated for combustion thereof with the first portion of the stabilized airflow to operate the ramjet thruster component, and a second thrust generated thereby along the axis is measured for a selected ramjet thrust period. The first portion of the stabilized airflow is maintained through the engine structure and the second portion of the airflow is maintained through the bypasses, and a corresponding reference thrust value along the thrust axis is measured. All of the airflow through the bypasses exits in a direction perpendicular to the thrust axis, and does not contribute to the measured axial thrust.

DETAILED DESCRIPTION OF THE PREFERRED EMBODIMENTS

Figure 1:
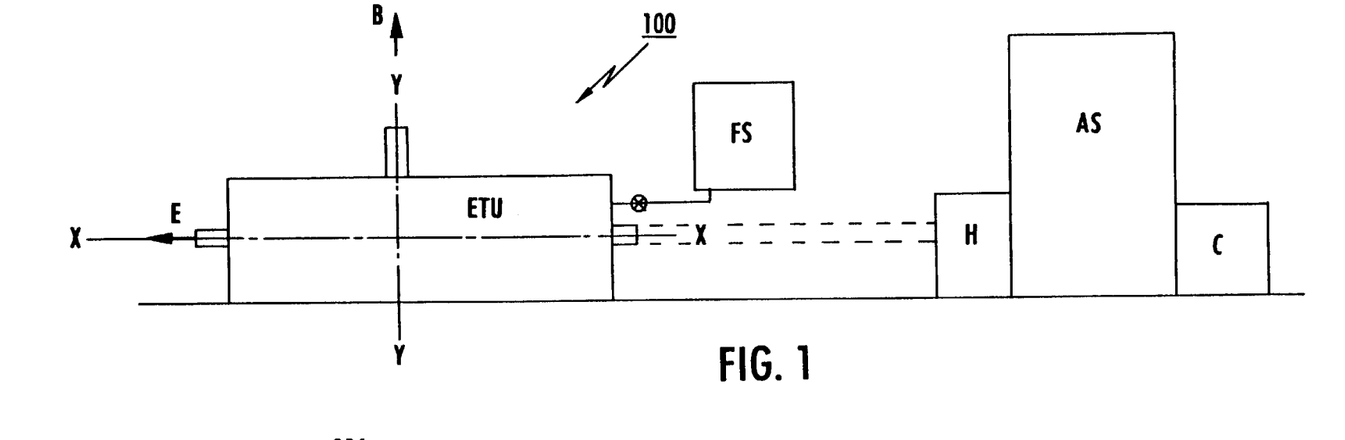
FIG. 1 is a schematic diagram of the layout of the principal larger components of a test facility suitable for realistically simulating selected multi-mode engine operations with this invention.

As best seen in FIG. 1, in an exemplary multi-mode aircraft engine test facility 100, in which the present invention may be advantageously utilized, there is provided a compressor "C" which obtains air from the ambient atmosphere, filters it, and compresses it to a selected above-atmosphere pressure in an air storage tank as from which compressed air may be delivered via a heater unit. "H" at a selected pressure and temperature. As persons of ordinary skill in the art will appreciate, there may also be safety valves, measurement devices and the like, but details of such elements are not critical to an understanding of this invention. For this reason, broken lines are utilized to indicate that heated compressed air is delivered to the engine test unit "ETU" which preferably has an internal structure (described more fully hereinbelow) aligned along the principal longitudinal horizontal axis X—X.

The engine test unit has a thrust delivery end (the left-hand end) from which a high-speed flow of exhaust gases is expelled in the direction of the arrow "E" to generate thrust. This, per Newton's Second Law of Motion, will produce a rightward thrust of equal magnitude, and this thrust is one of the measured parameters of interest in the utilization of this invention.

A critical aspect of this invention is that a flow of heated compressed air from air supply "AS" is initially utilized to bring a substantial portion of the ducting and the like to a raised operating temperature, the compressed airflow then being blown out to atmosphere in a direction perpendicular to axis X—X, as indicated generally in FIG. 1 by the arrow "B" along the direction of a bypass axis Y—Y orthogonal to thrust axis X—X. Subsequently, a first portion of the heated compressed airflow from air supply "AS" is mixed with fuel from fuel supply "FS" in a ramburner inside the engine test unit and a second portion of the heated compressed airflow is blown out along arrow "B" via the bypass.

Figure 2:
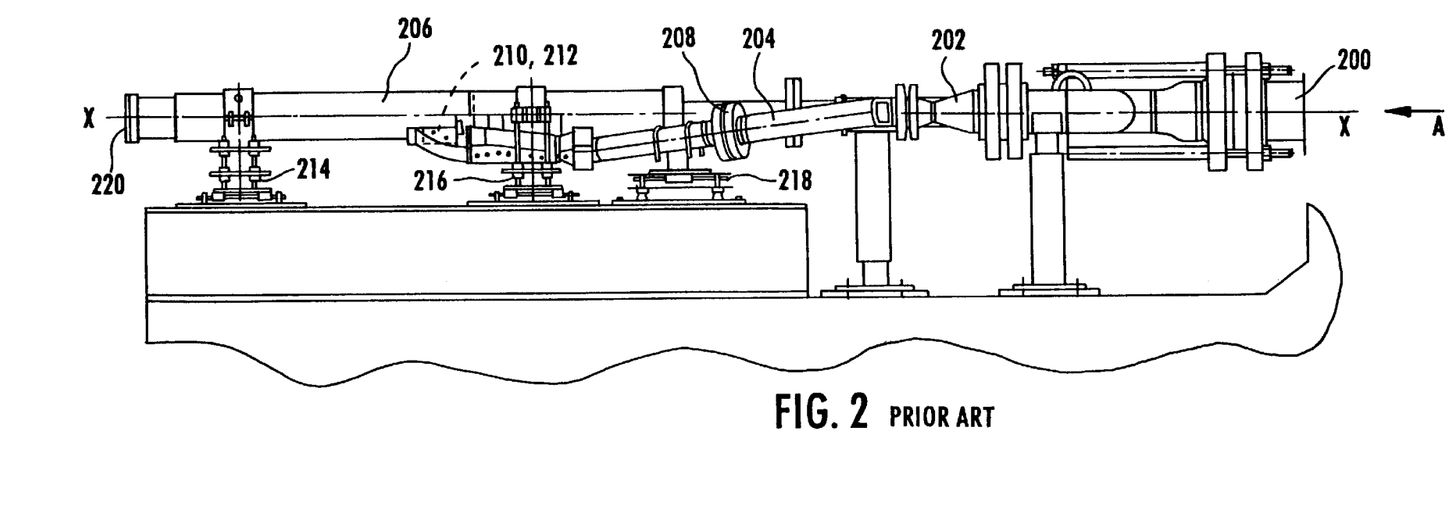
FIG. 2 is a side elevation view of the basic test unit prior to modification according to this invention.

FIG. 2 is a side elevation view of certain elements included within the structure of the engine test unit "ETU". These include, from the right to the left, a main inlet duct 200 into which heated compressed air flows along arrow "A" which is preferably, but not necessarily, aligned with the thrust axis X—X. The airflow then passes through a reducer 202, through a number of branch ducts 204 corresponding to the number of air inlets in the test engine, to an elongate thrust chamber 206 via respective subsonic inlet sections 208 of which there is one for each branch duct 204. Thrust chamber 206 is provided with an inlet port 210 for each of the branch ducts 204, and each inlet port 210 is provided with an openable "port cover" 212 (not shown) which must be opened to permit flow of heated compressed air from the corresponding branch duct 204, through corresponding subsonic inlet sections 208, into thrust chamber 206. Note that the thrust chamber 206 and other related elements may be mounted in known manner on a plurality of supports 214, 216, 218 which are instrumented, e.g., via load cells, to measure thrust generated by operation of propulsion in the thrust chamber 206. The thrust is generated by combustion in one or more modes inside thrust chamber 206 and the products of combustion are expelled at high velocity along thrust axis X—X to the left from nozzle opening 220, but seen in FIG. 2.

A problem in using the basic test facility as described above with reference to FIG. 2 is that without the present invention there is no throughflow of heated compressed air from air supply "AS" through the main duct 200, reducer 202, branch ducts 204, subsonic inlet sections 208 and inlet ports 210, until the inlet ports 210 are opened. These enumerated elements together constitute a relatively large thermal mass, and for a significant period of time there will be significant initial cooling of the incoming heated compressed air at entry into thrust chamber 206. The consequence of this is that it becomes impossible to realistically test a multi-mode aircraft propulsion system in which there is initial thrust generated by a rocket motor followed by thrust generated in a ramburner. Although the cooling may be significant only for periods as short as fifteen seconds, this is much too long to realistically simulate the rocket-ramjet mode transition. The principal purpose of the present invention is to overcome this particular problem, and is accomplished by structure and techniques described below.

Figure 3:
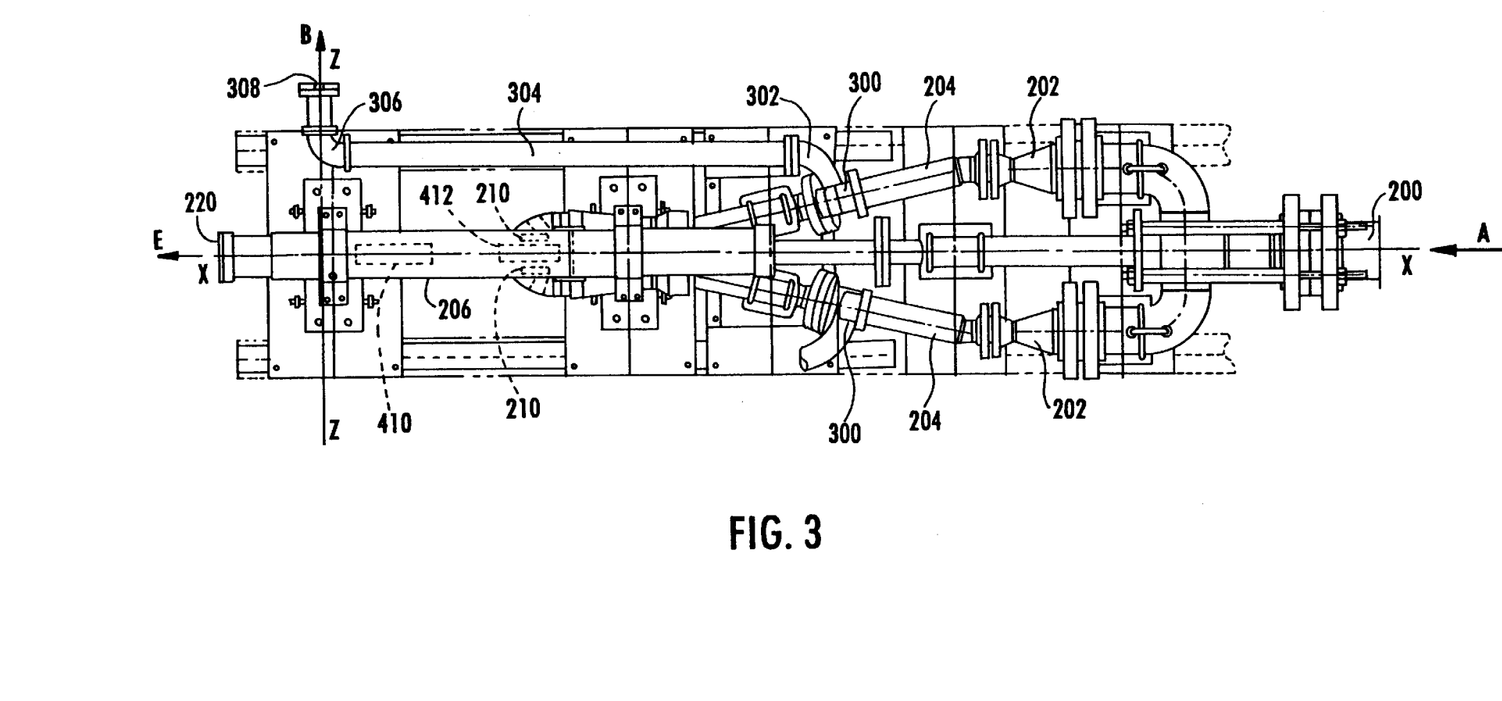
FIG. 3 is a plan view of the first preferred embodiment of the apparatus of this invention.
Figure 4:
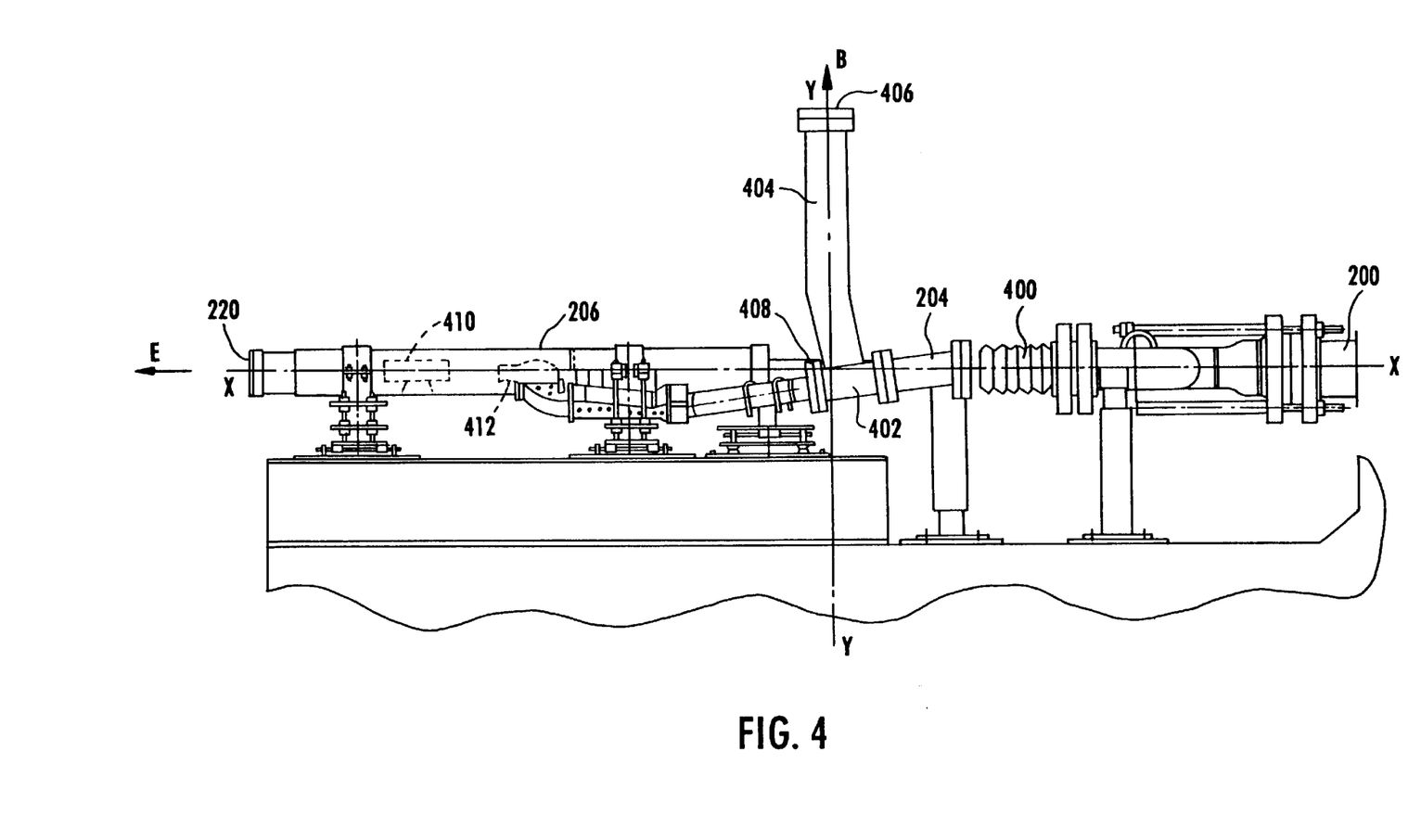
FIG. 4 is a side elevation view of another preferred embodiment of the apparatus.

The principal objective of the invented structure, namely to convey a portion or all of the heated compressed airflow received from air supply "AS" through main duct 200 without affecting the total thrust developed along thrust axis X—X, can be realized by directing that airflow radially outward in a plane containing an axis Y—Y that is orthogonal to thrust axis X—X. FIGS. 3 and 4 show two alternative embodiments of relatively simple and inexpensive structure by which this can be realized.

In the first preferred embodiment per FIG. 3, a T-duct junction 300 is fitted, via appropriate flanges, into each of the branch ducts 204, 204. This enables diversion or bypassing of a portion of the total heated compressed airflow through the corresponding branch duct 204 via elbow 302, bypass ducting 304, and elbow 306 so that the bypass flow exits through an opening 308 in the direction of arrow "B", e.g., along an axis Z—Z which is perpendicular to thrust axis X—X. Opening 308 is preferably provided in a known kind of calibrated orifice plate (not shown) which typically has the form of a flat plate with a sharp edged opening formed therein. Such an orifice plate can be readily replaced by another and differently calibrated orifice plate as appropriate, e.g., to provide different test conditions.

Thus, during ramjet mode operation, the opening 308 and the ramjet exit 220 determine the respective air flow through the bypass 304 and thrust chamber 206.

As in virtually all research and development projects, there is a considerable amount of theoretical analysis performed before test equipment is formed, calibrated, and reference values for proper use thereof developed empirically. Details of such activity should be well known to persons of ordinary skill in the art who may utilize the present invention, hence such details are not provided herein. What is important is that appropriately sized orifice plates can be readily installed at a downstream end of T-duct junctions 300, 300 and/or at the exit openings 308, 308 in the bypass ducting. Note that in FIG. 3, for the sake of simplicity, only one of the bypass ducting arrangements is shown completely and the other is shown partially.

In the second preferred embodiment per FIG. 4, the reducers 202, 202 which were included in the preferred embodiment per FIG. 3 are replaced by exemplary known expansion joints 400, 400, one connected to each of the branch ducts 204, 204. Also, in the embodiment of FIG. 4, each branch duct 204 is provided a T-duct junction 402 connected directly to an upright bypass duct 404 through which the bypassed airflow is expelled into ambient atmosphere along arrow "B" through an end opening 406 which may be the opening in a suitably calibrated conventional orifice plate (not shown).

The advantage in employing the structure per FIG. 4 is that fewer structural elements are required in each bypass duct portion of the overall structure. However, in test facilities where there may be other structures immediately above the engine test unit "ETU", e.g., lifting equipment, other laboratory facilities, etc., it may be preferable to utilize the structure per FIG. 3, or an obvious variation thereof. The key, as emphasized earlier, is that the bypass flow must exit the system in a direction perpendicular to thrust axis X—X so that the portion of the heated compressed airflow which is not utilized to generate a ramjet thrust is deliberately made as irrelevant as possible to the ongoing useful thrust measurements relating to operation of the propulsion system in its rocket propulsion mode, its ramjet propulsion mode and in transition therebetween.

As generally indicated in FIGS. 3 and 4, a rocket motor 410 is mounted inside thrust chamber 206 so as to provide a thrust in the direction of arrow "E" along thrust axis X—X when actuated and operated. Such a rocket motor, of the type typically used in missiles, has a generally hollow cylindrical structure formed of a combustible solid propellant material which, in use, is ignited at its axis and burns with its own internally contained oxidizer material. The combustion is thus sustained at the axis of the rocket motor and the products of combustion are expelled in the direction of arrow "E" along the thrust axis X—X as the fuel is consumed in a radially outward direction.

Conventional instrumentation may be provided to measure an internal pressure in thrust chamber 206, the thrust along the axis X—X, or the acceleration along the axis X—X to enable determination of the time at which thrust generation by rocket motor 410 is about to terminate or has actually terminated. It is important in such multi-mode propulsion systems to know this timing because, ideally, the ramburner should be functioning and ramjet thrust propulsion available immediately upon termination of the rocket thrust. Obviously, depending upon the simulated conditions under which such a propulsion system is being employed at any given time, e.g., the altitude, the Mach number, or the like, very precise control must be exercised over the parameter-sensing instrumentation, the control system receiving signals from such instrumentation, and exercise of control by the control system over the air and fuel flows to promptly initiate and stably operate the ramburner to generate the desired sustained ramjet thrust. Any suitable ramburner, fuel flow controls, and the like, may be utilized, hence, details of such well-known elements and incidental structures are omitted from the drawing figures for simplicity. Persons of ordinary skill in the art can be readily expected to understand how to choose, correct and use such elements with the present invention.

The fuel may be conventional liquid hydrocarbon jet fuel, or may be the product of partial combustion of a solid fuel-rich propellant. Any other suitable fuel may be utilized with appropriate delivery means.

The inlet port covers, of which numerous types are available in the art, are opened rapidly under the control of the control means such as a programmable computer, although manually operable port cover release means may also be utilized instead. It should be appreciated that prior to opening of the inlet port covers there will be a pressure difference across them corresponding to the instantaneous values of the pressure of the heated compressed air upstream of the port covers and the pressure inside the thrust chamber. While rocket motor 410 is in operation the pressure inside the thrust chamber will be higher than will be the case when the rocket motor 410 terminates its operation. The pressure difference "ΔP" across the inlet port covers can be measured and a corresponding signal provided to the control means to precisely determine the timing of the opening of the inlet port covers, all in known manner with conventional pressure sensors, relays and the like. Delivery of fuel to the thrust chamber is coordinated with the inflow of heated compressed air to the thrust chamber, also in known manner.

It should be appreciated that since the rocket motor will have been operating prior to entry of the fuel and heated compressed air to ramburner 412, depending on the fuel/air ratio and the chemical composition and nature of the fuel selected, there may be autoignition in the ramburner and a corresponding generation of ramjet thrust. It is also possible that the sequence of actions may be timed in such a way that residual slivers of fuel from the rocket motor may still be in active combustion (recall that the rocket fuel contains its own oxidizer) and may facilitate initiation of combustion of the mixture of fuel and heated compressed air provided to the thrust chamber to generate ramjet thrust.

Although it is a critical feature of this invention that all airflow through the bypass openings, i.e., 308 in the embodiment per FIG. 3 and 406 in the embodiment per FIG. 4, be directed perpendicular to thrust axis X—X, it may be advisable to maintain a flow of heated compressed air through the thrust chamber even after fuel flow is terminated, all the while continuing to measure and record the sensed thrust experienced by thrust chamber 206 on its instrumented mountings. If there is any finite thrust thus recorded, it can be treated as a reference thrust value and used to appropriately correct the thrust measured during operation of the apparatus in its rocket propulsion mode, rocket-to-ramjet transition and ramjet propulsion mode, respectively.

It is considered that in the typical missile propulsion system of this kind, i.e., one employing rocket-to-ramjet transition, thrust production by the ramjet component of the propulsion system should not be delayed significantly beyond 200 msec following termination of thrust generation by the rocket component. Since the present invention, as described, is intended to simulate the performance of corresponding real-life propulsion systems, control over the various flows, and particularly over the timing and swiftness of opening of the inlet port covers must be such as to provide rocket-to-ramjet transition in a comparably short time period.

In a prototype test facility the total heated air supply was selected to be between two and three times the estimated amount needed for proper ramjet thrust production. Since all of the heated compressed airflow received by main duct 200 must initially be bypassed, the corresponding T-duct junction, bypass ducting, etc., must be sized to suit. A bypass duct diameter in the range 6–10 in. is considered realistic for use with a thrust chamber having a cross-sectional area of the order of 32 in$^2$.

Figure 5:
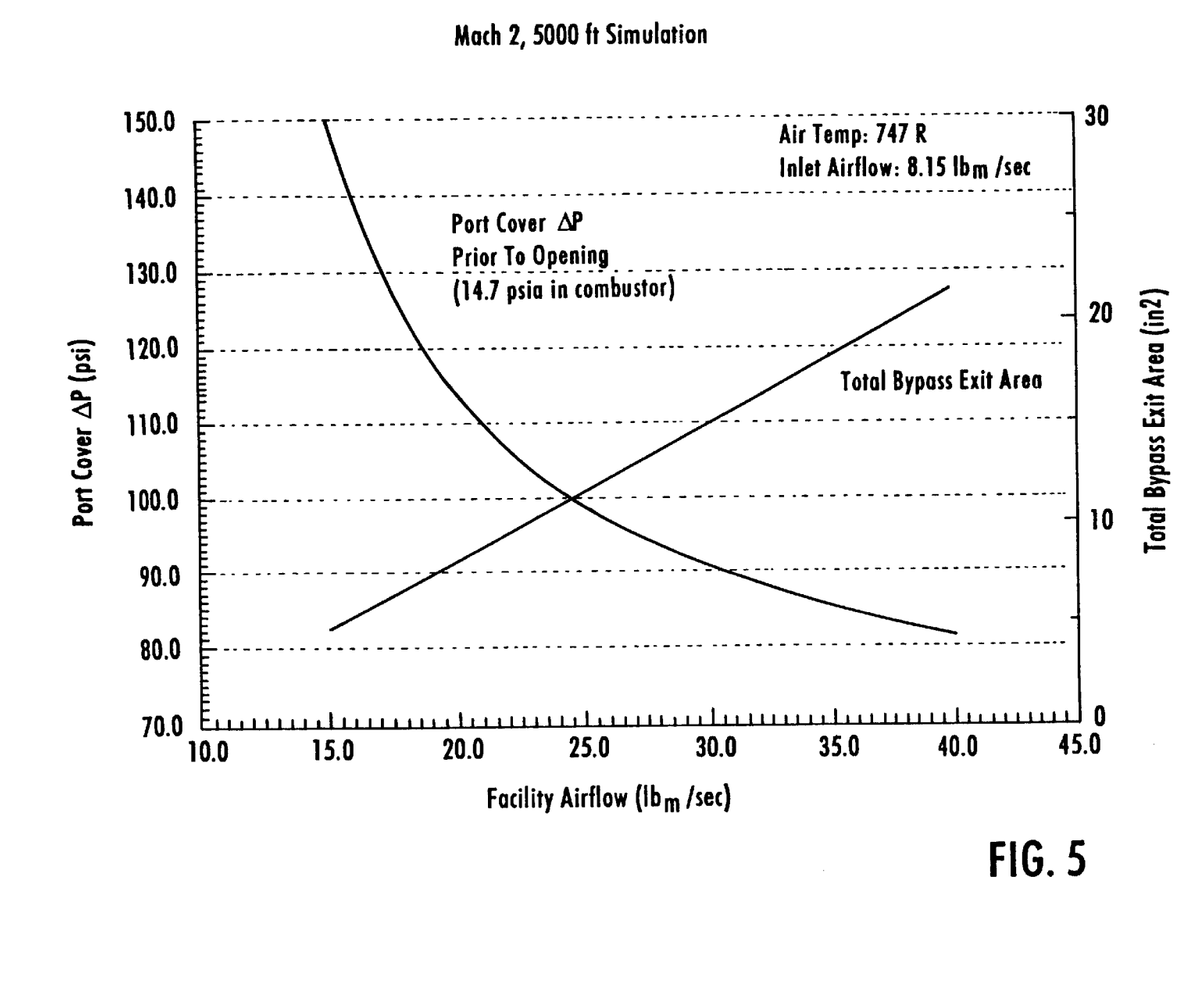
FIG. 5 is a representative multi-parameter graphical plot of the variation of Port Cover Differential Pressure $\Delta P$ v. Facility Airflow $Q_F$, and of Total Bypass Exit Area $A_B$ v. Facility Airflow $Q_F$, under operating conditions simulating Mach 2 at 5,000 ft. for a 7-inch diameter engine.
Figure 6:
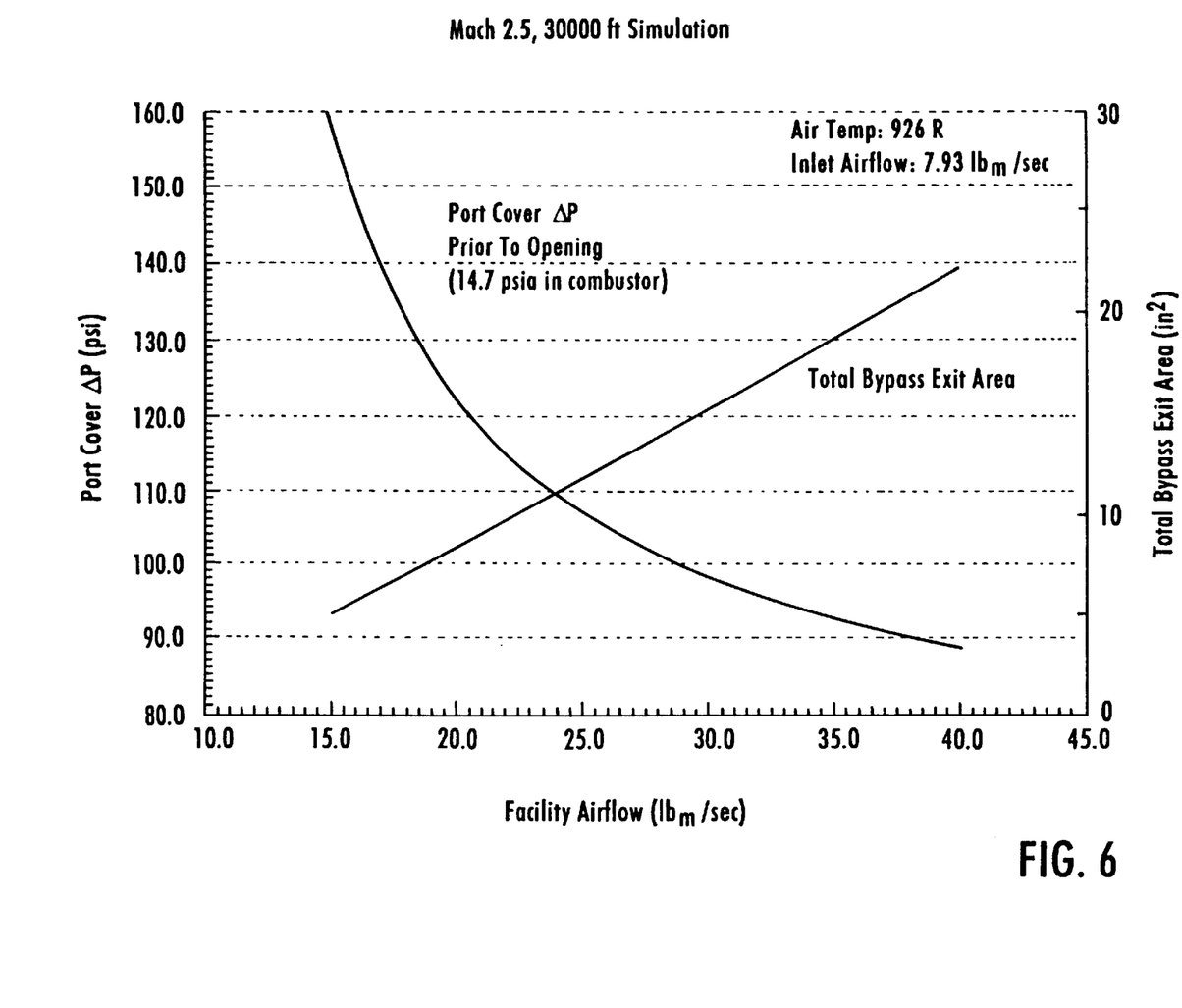
FIG. 6 is a representative multi-parameter graphical plot of the variation of Port Cover Differential Pressure $\Delta P$ v. Facility Airflow $Q_F$, and of Total Bypass Exit Area $A_B$ v. Facility Airflow $Q_F$, under operating conditions simulating Mach 2.5 at 30,000 ft. for a 7-inch diameter engine.
Figure 7:
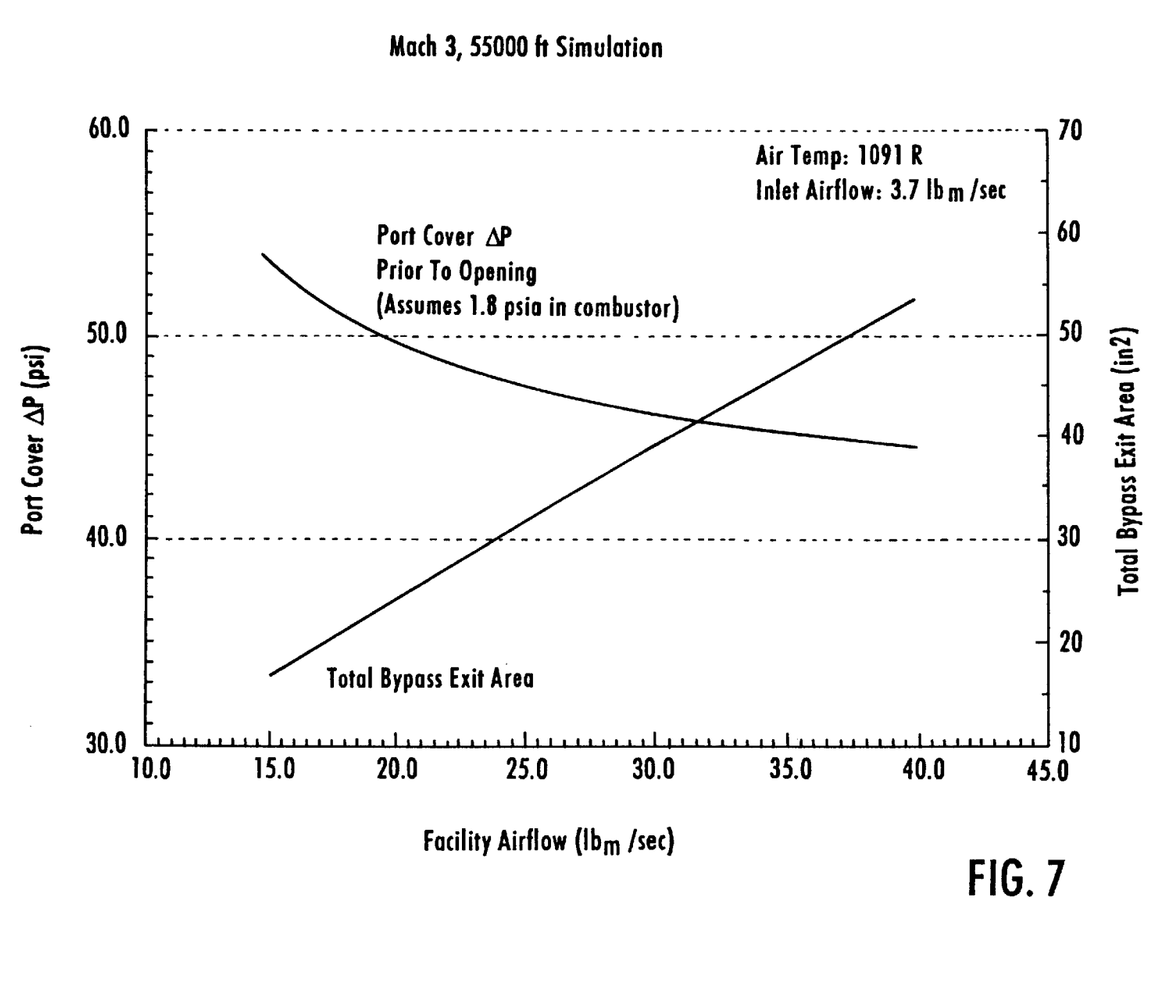
FIG. 7 is a representative multi-parameter graphical plot of the variation of Port Cover Differential Pressure $\Delta P$ v. Facility Airflow $Q_F$, and of Total Bypass Exit Area $A_B$ v. Facility Airflow $Q_F$, under operating conditions simulating Mach 3 at 55,000 ft. for a 7-inch diameter engine.

FIGS. 5, 6 and 7 are graphical plots which show various operational parameters of interest for selected simulated real-life operating conditions, as developed for operation of the prototype facility. Taking FIG. 5 as an example, it will be seen that to simulate real-life conditions for a multi-mode rocket/ramjet propulsion system operating at an altitude of 5,000 feet for a vehicle moving at Mach 2, in a prototype system having a thrust chamber with a cross-sectional area of about 32 in$^2$, the required total bypass exit area varies linearly with the facility airflow (lbm/sec) as shown. The curved plot represents the variation of the pressure difference "ΔP" across the inlet port cover at different rates of flow of the heated compressed air into the main duct. With this information, it becomes possible to select the bypass exit area to thereafter install a correctly sized orifice plate at the exit end of the bypass ducting.

FIGS. 6 and 7 are similar figures which show data for two other conditions: (1) Mach 2.5, 30,000 ft. simulation, and (2) Mach 3, 55,000 ft. simulation. Obviously, if individual dimensions, flow rates, and/or fuel compositions are changed to practice this invention for other simulated conditions, it may be necessary to develop corresponding graphical plots.

The operation of both embodiments is essentially the same. First, by reference to data such as that contained in FIGS. 5–7, appropriately sized orifice plates are selected and fitted to the respective bypass exits. The compressor "C" is then operated until a sufficiently large air supply at a desired pressure is collected. Whether heating is provided to this compressed air as it is transferred out from air supply "AS" or while within it is a matter of choice but not critical to operation of the invention. The key is that a selected controlled rate of flow of compressed air at a selected temperature be available for the duration of the entire projected test.

The heated compressed airflow initially is simply run through the main duct 200, the branch ducts 204, and the bypass ducts 304 or 404 out to atmosphere until the temperature of the system has stabilized as determined by suitably disposed temperature sensors. The amount of time required for this will naturally depend on ambient conditions, the thermal mass of the elements involved, and the selected temperature of the heated compressed airflow.

Once stabilization has thus been obtained, the control system should operate to initiate the rocket burn. Various parameters of interest may be measured, displayed as needed in conventional manner, and recorded also in known manner. As the rocket motor nears the termination of its operational life, since most of its bulk is typically constituted of a hollow cylindrical block of solid fuel/propellant material, upon completion of its useful life it will virtually vanish from inside the thrust chamber. When the corresponding pressure inside the thrust chamber is measured and begins to drop, the control system should actuate fuel inflow to the thrust chamber and the ramburner located therein. Simultaneously, the port covers must be opened rapidly to thereby permit an inflow of heated compressed air to the ramburner to burn the fuel now being provided.

It is highly desirable that autoignition should occur and that combustion in the ramburner 412 should thereafter be sustained even as the fuel/air ratio is varied as part of the test operation. It may be possible to provide assurance of combustion of the fuel in the heated compressed air by installing electrical spark plugs or the like in the ramburner. In any case, following a period of delivering thrust from the rocket motor, the ramjet component of the system should provide ramjet thrust until the fuel supply is terminated.

Following termination of the fuel supply to the ramburner, it is considered desirable to continue flowing the heated compressed air through the thrust chamber for a short period, and to measure the magnitude of any thrust experienced by the thrust-sensing instrumentation. The thrust value should be considered carefully and may be employed as a reference value to correct the thrust measured in the rocket, rocket-to-ramjet transition, and ramjet thrust production modes.

Provided the appropriate parameters and dimensions are selected correctly, it should become possible to ensure that stable operating conditions are reached to correspond to real-life conditions which are to be simulated, selected rocket motors may be tested sequentially, and assorted fuels for the ramjet burner may also be tested. The behavior of the system in transition from rocket-to-ramjet operation can thus be studied in detail through generous instrumentation and analysis of the collected data.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. Apparatus for simulating in an aircraft test engine assembly a transition from rocket propulsion mode to ramjet propulsion mode, comprising:

an elongate thrust chamber having a longitudinal thrust axis, an exit nozzle, a fuel inlet to receive a fuel flow, an airflow inlet port, an airflow inlet port cover and a ramburner;

a rocket motor, mounted inside the thrust chamber between the exit nozzle and the ramburner to provide a rocket thrust along said thrust axis via said exit nozzle;

airflow supply means for providing a controlled flow of heated compressed air to said ramburner via said airflow inlet port;

fuel supply means for providing the fuel flow to said thrust chamber via said fuel inlet;

main air duct means for communicating said airflow supply means to the airflow inlet port through a branch duct via a subsonic inlet section;

bypass duct means, having an inlet end communicating with the branch duct at a location upstream of the subsonic inlet section, for bypassing at least a first portion of the heated compressed airflow away from the main air duct means and through a calibrated bypass exit in a direction perpendicular to said thrust axis; and control means for controlling a flow rate and selected state parameters of said heated compressed airflow, for controlling an opening of said port cover means to deliver a second portion of said heated compressed airflow from said main air duct means via said airflow inlet port to said ramburner via said thrust chamber, and for controlling said flow of fuel to enable controlled combustion thereof in said ramburner to produce a corresponding ramjet thrust along said thrust axis via said exit nozzle.

2. The apparatus according to claim 1, wherein:
   said bypass duct means comprises a calibrated orifice plate at said calibrated bypass exit.

3. The apparatus according to claim 1, wherein:
   said subsonic section comprises a flow passage simulating a subsonic portion of the engine inlet.

4. The apparatus according to claim 1, wherein:
   said control means comprises means for sensing an operating condition in said thrust chamber during operation of said rocket motor, and upon determining when a predetermined criterion is satisfied by said sensed operating condition opening said port cover means and said fuel supply means to initiate and maintain a controlled combustion of said fuel in said ramburner to generate said ramjet thrust.

5. The apparatus according to claim 4, wherein:
   said ramjet thrust is initiated only after substantial completion of said operation of said rocket motor.

6. The apparatus according to claim 5, wherein:
   said control means comprises means for measuring values of thrust produced in said thrust chamber along said thrust axis from a time prior to operation of said rocket motor to a time following termination of both said rocket thrust and said ramjet thrust.

7. The apparatus according to claim 6, further comprising:
   means for measuring, timing, displaying and recording a plurality of selected operational parameters determined during operation of said rocket motor, generation of said ramjet thrust, and during a period representing a time of transition from a rocket propulsion mode corresponding to generation of said rocket thrust and a ramjet mode corresponding to generation of said ramjet thrust.

8. The apparatus according to claim 1, wherein:
   the rocket motor is powered by a first solid propellant.

9. The apparatus according to claim 1, wherein:
   the ramjet fuel comprises a liquid propellant.

10. The apparatus according to claim 1, wherein:
    the ramjet fuel comprises a gaseous combustible material generated by partial combustion of a second solid propellant.

11. A method of operating a test facility having respective sources providing a fuel flow and an airflow at selected pressure and temperature through a main duct via a plurality of branch ducts provided with respective bypasses, for selectively providing a first portion of the airflow into a multi-mode thrust engine structure which includes a rocket thruster component and a ramjet thruster component both aligned to deliver respective rocket and ramjet thrusts along a common thrust axis, comprising the steps of:

controlling said airflow to pass the same entirely through said main duct, said branch ducts, and said bypasses, until stable values of a total flow rate, a total pressure and temperature are obtained for the airflow;

initiating operation of the rocket thruster component, and measuring a first thrust generated thereby along said thrust axis for a selected rocket thrust period;

sensing an operating condition in the thrust chamber corresponding to a termination of said first thrust and, in correspondence with the sensed operating condition, enabling said first portion of the stabilized airflow to pass through the engine structure and a second portion of the stabilized airflow to pass through the bypasses;

initiating a controlled fuel flow for combustion thereof with said first portion of the stabilized airflow to operate said ramjet thruster component, and measuring a second thrust generated thereby along said axis for a selected ramjet thrust period; and maintaining said first portion of the stabilized airflow through the engine structure and said second portion of the stabilized airflow through the bypasses after said ramjet thrust period, and measuring a corresponding reference thrust value along said axis, wherein all airflow through the bypasses exits in a direction perpendicular to said thrust axis.

12. The method according to claim 11, comprising the further step of:

providing orifice plates at respective airflow exits of the bypasses, the orifice plates being calibrated to enable obtaining selected values of specific flow parameters in the engine structure to thereby simulate predetermined flight conditions for an aircraft to be powered by a multi-mode propulsion system corresponding to said engine structure.

13. The method according to claim 11, comprising the further step of:

adjusting at least one of the fuel flow and the first portion of stabilized air flow to correspondingly vary a fuel/air ratio in the ramjet thruster component to simulate selected flight conditions.

* * * * *